United States Patent
Soma

(10) Patent No.: US 12,532,283 B2
(45) Date of Patent: Jan. 20, 2026

(54) WIRELESS COMMUNICATION APPARATUS AND WIRELESS COMMUNICATION SYSTEM

(71) Applicant: CANON KABUSHIKI KAISHA, Tokyo (JP)

(72) Inventor: Tomoyasu Soma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 397 days.

(21) Appl. No.: 18/149,516

(22) Filed: Jan. 3, 2023

(65) Prior Publication Data
US 2023/0224842 A1    Jul. 13, 2023

(30) Foreign Application Priority Data

Jan. 13, 2022   (JP) .................................. 2022-003904

(51) Int. Cl.
*H04W 56/00*    (2009.01)

(52) U.S. Cl.
CPC ....... *H04W 56/005* (2013.01); *H04W 56/001* (2013.01)

(58) Field of Classification Search
CPC .......................... H04W 56/005; H04W 56/001
See application file for complete search history.

(56) References Cited

U.S. PATENT DOCUMENTS

| | | | |
|---|---|---|---|
| 10,931,498 B1* | 2/2021 | Dorosenco | H03L 7/1976 |
| 2004/0132421 A1* | 7/2004 | Underbrink | H03L 7/081 |
| | | | 455/562.1 |
| 2011/0304357 A1* | 12/2011 | Tokairin | H03L 7/091 |
| | | | 327/12 |
| 2014/0159788 A1* | 6/2014 | Chen | H03L 7/085 |
| | | | 327/156 |
| 2020/0003883 A1* | 1/2020 | Doaré | H04L 27/0008 |
| 2021/0320783 A1* | 10/2021 | Masuda | H04L 7/0012 |

FOREIGN PATENT DOCUMENTS

| | | |
|---|---|---|
| JP | 2014116982 A | 6/2014 |
| JP | 2018157308 A | 10/2018 |
| WO | 2010104164 A1 | 9/2010 |

* cited by examiner

*Primary Examiner* — Ayman A Abaza
*Assistant Examiner* — Benjamin T. Ranew
(74) *Attorney, Agent, or Firm* — Canon U.S.A., Inc. IP Division

(57) ABSTRACT

A wireless communication system includes two wireless communication apparatuses. One of the wireless communication apparatuses wirelessly transmits a signal obtained by up-converting a clock signal. The other of the wireless communication apparatuses generates a clock signal based on a received signal and feeds back a signal obtained by up-converting the generated clock signal to the one wireless communication apparatus. The one wireless communication apparatus generates a clock signal based on the fed-back signal, detects a phase change due to a fluctuation in a transmission path characteristic based on the generated clock signal, and adjusts a phase of a reference clock signal based on the detected phase change.

11 Claims, 10 Drawing Sheets

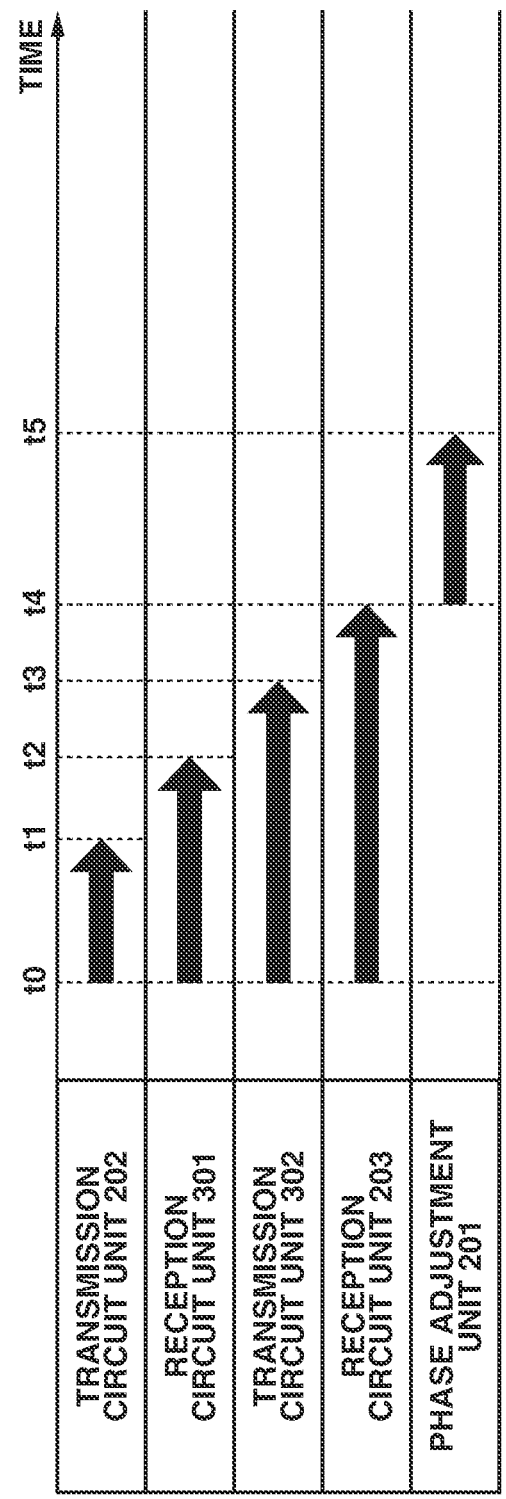

WIRELESS COMMUNICATION APPARATUS AND WIRELESS COMMUNICATION SYSTEM

BACKGROUND

Field

The present disclosure relates to a wireless communication apparatus and a wireless communication system.

Description of the Related Art

A technique is known in which an apparatus equipped with a reference clock signal source (hereinbelow, referred to as a clock source apparatus) wirelessly transmits a signal synchronized with a reference clock signal, and an apparatus that receives the transmitted signal (hereinbelow, referred to as a clock reproduction apparatus) reproduces a clock signal based on the received signal. In Japanese Patent Application Laid-Open No. 2014-116982, a technique is discussed in which control information is obtained from a state of synchronization between a clock signal reproduced by a clock reproduction apparatus and a reference clock signal. The control information is then fed back to a clock source apparatus, and the clock source apparatus adjusts a phase of a signal the clock source apparatus transmits based on the control information.

In an environment in which an antenna position for communication changes or an object moves near a wireless transmission path, a signal phase can change due to a Doppler shift, which is caused by a change in distance of the wireless transmission path, or an influence of multipath propagation, for example. Hereinbelow, such a phase change is referred to as a phase change due to a fluctuation in a wireless transmission path characteristic.

A method discussed in Japanese Patent Application Laid-Open No. 2014-116982 provides synchronization between a signal received by the clock reproduction apparatus and a clock signal reproduced from the received signal. The signal received by the clock reproduction apparatus is synchronized with a reference clock signal, thus in a case where a phase change due to a fluctuation in a wireless transmission path characteristic does not occur, the reference clock signal of the clock source apparatus, the signal received by the clock reproduction apparatus, and the reproduced clock signal are in a synchronized state. However, there is an issue that, in a case where the phase change due to a fluctuation in the wireless transmission path characteristic occurs, the reference clock signal of the clock source apparatus and the clock signal reproduced by the clock reproduction apparatus may be not in synchronization with each other.

SUMMARY

Various embodiments of the present disclosure are directed to permitting synchronization of clock signals between apparatuses that wirelessly communicate with each other even in an environment in which a phase change occurs due to a fluctuation in a wireless transmission path characteristic.

According to one embodiment of the present disclosure, a wireless communication system includes a first wireless communication apparatus, and a second wireless communication apparatus, where the first wireless communication apparatus includes a first transmission circuit unit, a first reception circuit unit, a phase adjustment unit, and a first antenna unit, and where the second wireless communication apparatus includes a second reception circuit unit, a second transmission circuit unit, and a second antenna unit. The first transmission circuit unit wirelessly transmits, using the first antenna unit, a first signal generated based on a first clock signal. The second wireless communication apparatus receives the first signal using the second antenna unit, and the second reception circuit unit generates a second clock signal based on the first signal. The second transmission circuit unit wirelessly transmits from the second antenna unit to the first wireless communication apparatus, a second signal generated based on the second clock signal. The first reception circuit unit generates a third clock signal based on the second signal received by the first antenna unit. The phase adjustment unit detects a change in a phase due to a fluctuation in a transmission path characteristic, based on the third clock signal, and controls a phase of the first clock signal based on the detected change in the phase.

Further features of the present disclosure will become apparent from the following description of example embodiments with reference to the attached drawings.

BRIEF DESCRIPTION OF THE DRAWINGS

FIG. 10 is a time chart of each component block according to the second example embodiment

DESCRIPTION OF THE EMBODIMENTS

Example embodiments of the present disclosure will be described in detail below. The example embodiments described below do not necessarily restrict the present invention. All of the combinations of the features described in the example embodiments are not always essential to the means for solution according to each embodiment of the present disclosure.

Figure 1:
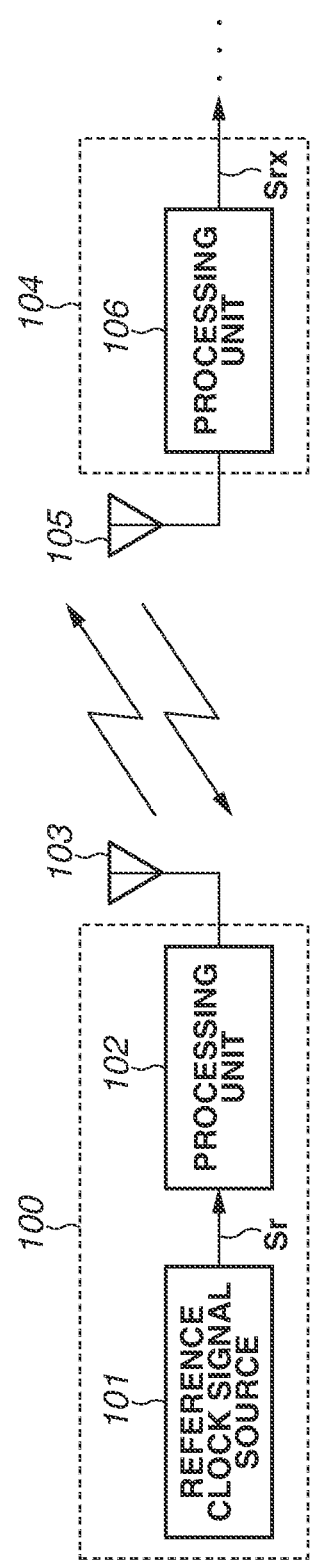
FIG. 1 illustrates a configuration of a wireless communication system according to a first example embodiment.

A configuration of an entire wireless communication system according to a first example embodiment is described below. FIG. 1 illustrates the configuration of the wireless communication system according to the present example embodiment. A clock source apparatus 100 is one of two apparatuses that synchronize clock signals therebetween. The clock source apparatus 100 includes a reference clock signal source 101 that generates a reference clock signal Sr, a processing unit 102 that performs various types of processing on the clock signal, and an antenna unit 103 that wirelessly transmits and receives signals. A clock reproduction apparatus 104 is the other of the two apparatuses that synchronize the clock signals therebetween. The clock reproduction apparatus 104 includes an antenna unit 105 that wirelessly transmits and receives signals, and a processing unit 106 that processes the received signal to reproduce the clock signal.

The clock source apparatus 100 generates the reference clock signal Sr by the reference clock signal source 101, processes the reference clock signal Sr by the processing unit 102, and then wirelessly transmits the signal by the antenna unit 103. The clock reproduction apparatus 104 receives the signal transmitted from the antenna unit 103 by the antenna unit 105, processes the signal by the processing unit 106 to reproduce a clock signal Srx, and feeds back the signal from the antenna unit 105 to the antenna unit 103. Based on the phase of the signal received by the antenna unit 103, the clock source apparatus 100 processes the signal to be transmitted again by the processing unit 102, and transmits the processed signal from the antenna unit 103. As described above, the wireless communication system according to the present example embodiment repeatedly performs feedback between the apparatuses by transmitting signals.

Figure 2:
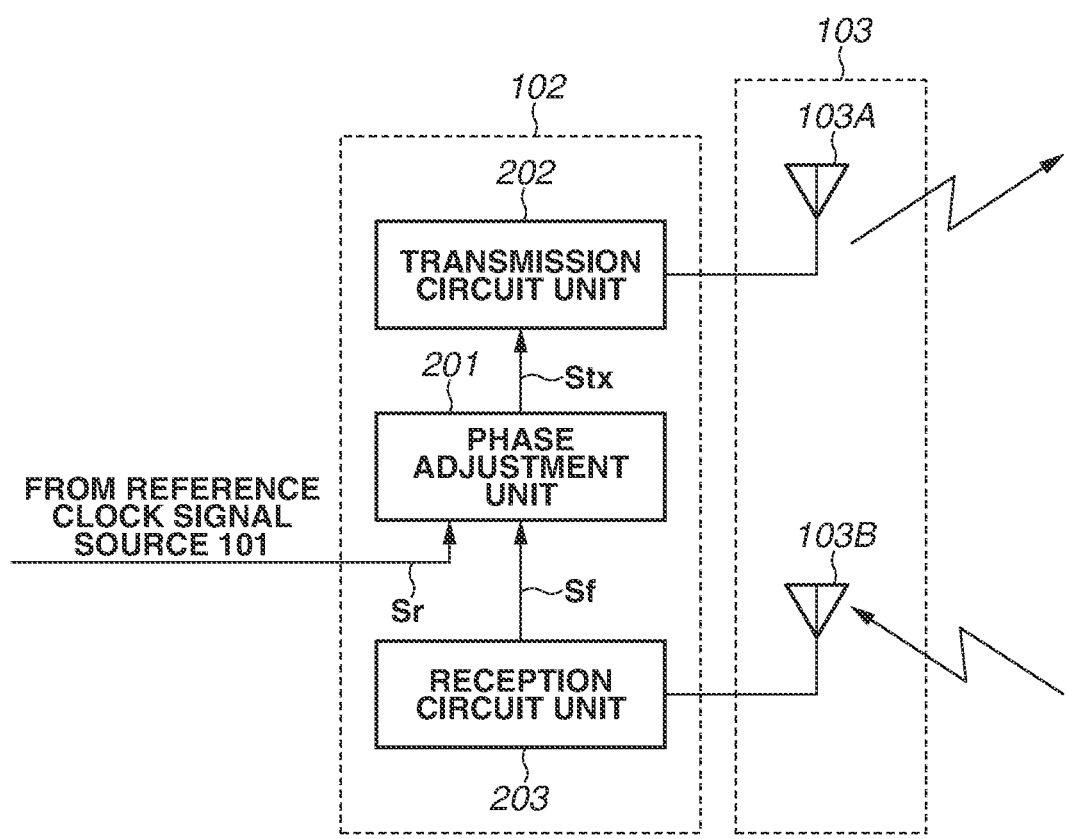
FIG. 2 illustrates a configuration of a clock source apparatus according to the first example embodiment.

Next, configurations and functions of the clock source apparatus 100 and the clock reproduction apparatus 104 are described in more detail. FIG. 2 illustrates the configurations of the processing unit 102 and the antenna unit 103 connected to the processing unit 102. The processing unit 102 includes a phase adjustment unit 201, a transmission circuit unit 202, and a reception circuit unit 203. The antenna unit 103 includes a transmission antenna 103A and a reception antenna 103B. The phase adjustment unit 201 generates a clock signal Stx, which is obtained by adjusting a phase of the reference clock signal Sr input from the reference clock signal source 101 based on a clock signal Sf input from the reception circuit unit 203. The transmission circuit unit 202 up-converts the clock signal Stx generated by the phase adjustment unit 201 and transmits the signal as a wireless signal from the transmission antenna 103A to a wireless transmission path. The reception circuit unit 203 down-converts a wireless signal received by the reception antenna 103B and inputs the down-converted signal to the phase adjustment unit 201 as the clock signal Sf. In an environment in which a wireless transmission path characteristic fluctuates, the phase adjustment unit 201 detects a phase change due to a fluctuation in the wireless transmission path characteristic based on a fed-back wireless signal. The phase adjustment unit 201 generates the clock signal Stx, which is obtained by adjusting a phase of the reference clock signal Sr based on a detection result of the phase change.

Figure 3:
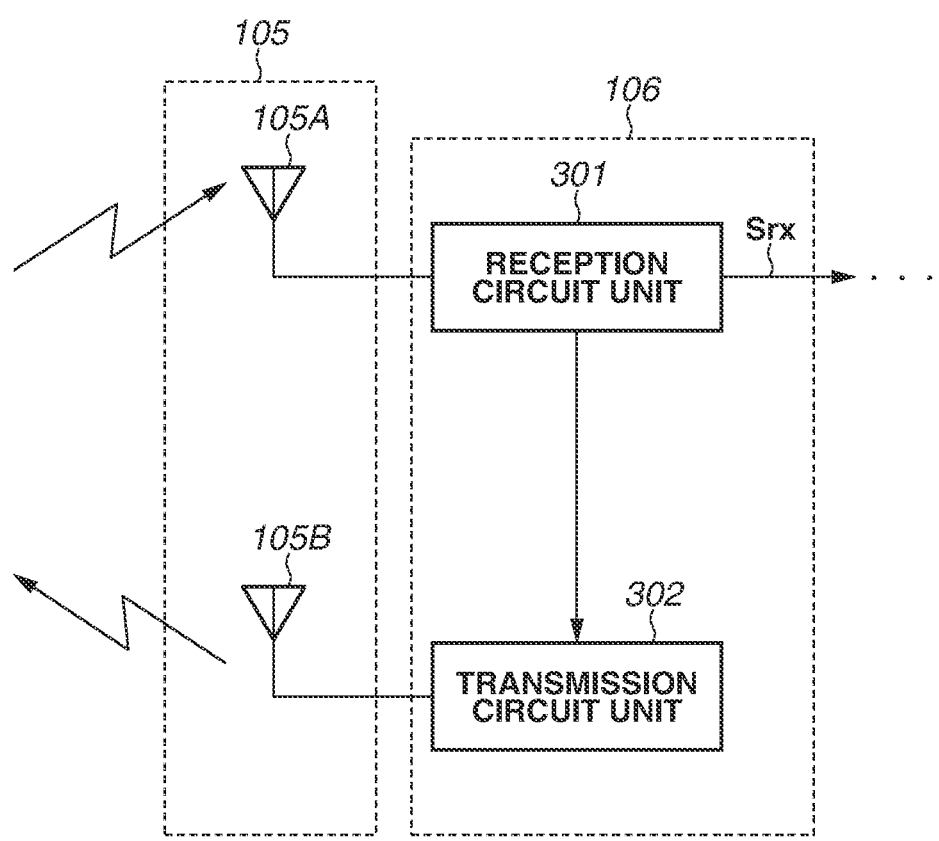
FIG. 3 illustrates a configuration of a clock reproduction apparatus according to the first example embodiment.

FIG. 3 illustrates configurations of the processing unit 106 and the antenna unit 105 connected to the processing unit 106. The processing unit 106 includes a reception circuit unit 301 and a transmission circuit unit 302. The antenna unit 105 includes a reception antenna 105A and a transmission antenna 105B. The reception circuit unit 301 down-converts a wireless signal received by the reception antenna 105A to reproduce the clock signal Srx and inputs the clock signal Srx to the transmission circuit unit 302. The transmission circuit unit 302 up-converts the clock signal Srx input from the reception circuit unit 301 and transmits the signal from the transmission antenna 105B to the wireless transmission path. As described above, in the wireless communication system according to the present example embodiment, the clock source apparatus adjusts the phase of the clock signal, and the clock reproduction apparatus reproduces the clock signal based on the received signal without adjusting the phase of the clock signal, and feeds back the received signal to the clock source apparatus.

Figure 4:
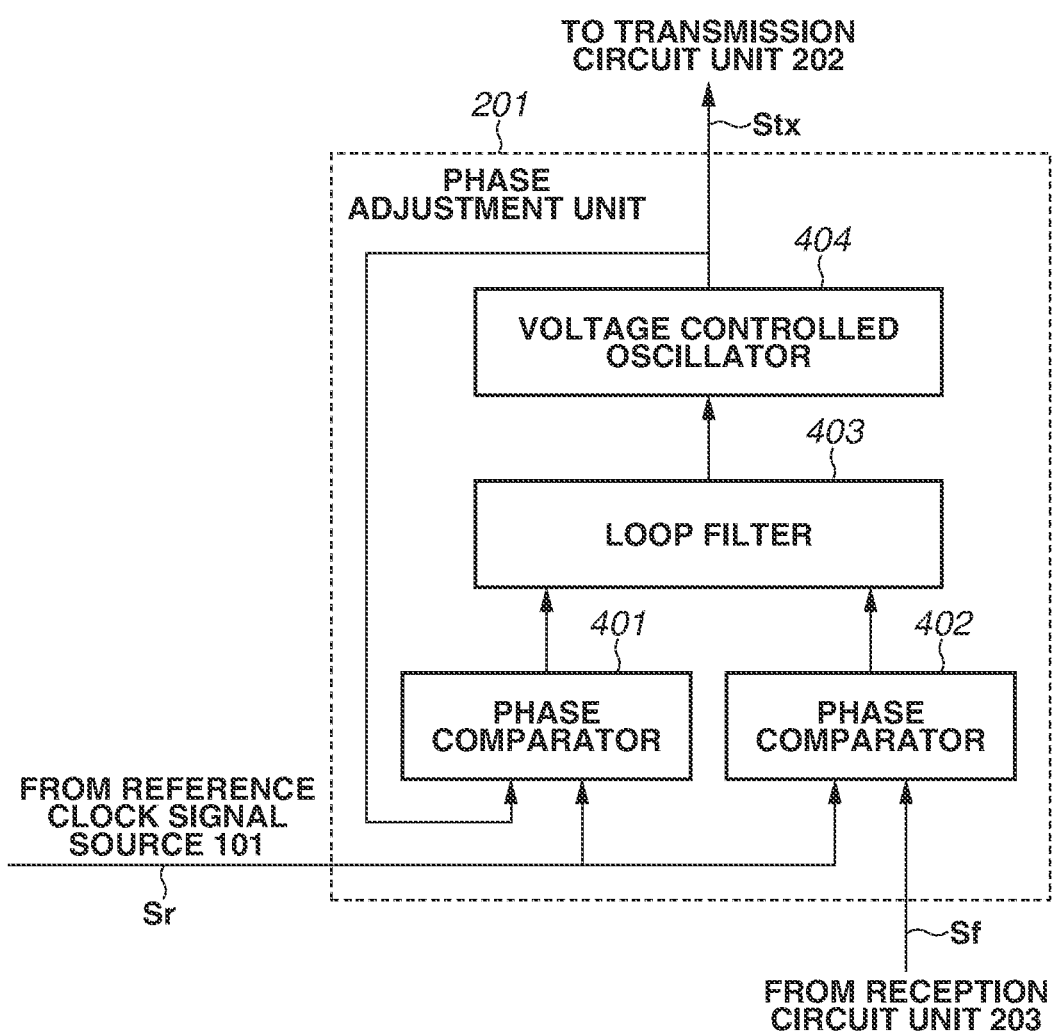
FIG. 4 illustrates a configuration of a phase adjustment unit according to the first example embodiment.

Next, how the received signal fed back is processed by the clock source apparatus, and how the phase of the clock signal Stx to be transmitted is adjusted are described. FIG. 4 illustrates a circuit configuration of the phase adjustment unit 201 illustrated in FIG. 2. The phase adjustment unit 201 includes phase comparators 401 and 402, a loop filter 403, and a voltage controlled oscillator 404. The phase comparator 401 compares a phase of the reference clock signal Sr with a phase of an output signal (clock signal Stx) of the voltage controlled oscillator 404 and outputs a detection result (a phase difference signal) corresponding to the phase difference. The phase comparator 402 compares the phase of the reference clock signal Sr with a phase of the clock signal Sf obtained from the wireless signal fed back from the clock reproduction apparatus 104 and outputs a detection result (a phase difference signal) corresponding to the phase difference. The loop filter 403 includes a differential integration circuit that receives the detection results respectively output from the phase comparators 401 and 402 as input. The loop filter 403 generates a signal corresponding to a difference between the two input detection results and outputs a direct current component from which a harmonic component is removed. The voltage controlled oscillator 404 generates a signal with a phase corresponding to the output of the loop filter 403 as the clock signal Stx. The phase adjustment unit 201 is a feedback control circuit that makes the phases of the clock signals compared by the two phase comparators 401 and 402 equal.

Figure 5:
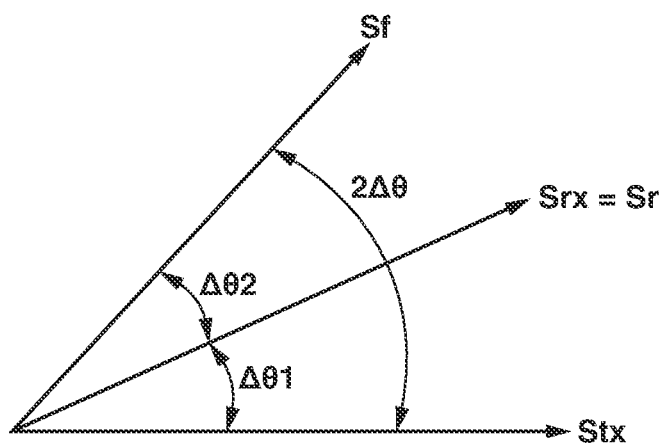
FIG. 5 illustrates a phase relationship of clock signals according to the first example embodiment.

FIG. 5 illustrates a phase relationship of the clock signals compared in the phase adjustment unit 201. FIG. 5 illustrates the phase relationship of the clock signals in a case where the reference clock signal Sr and the clock signal Srx reproduced by the clock reproduction apparatus are in a synchronized state. Here, it is assumed that the wireless transmission path characteristic is symmetrical, and a phase change amount due to the fluctuation in the wireless transmission path characteristic is defined as $\Delta\theta$. Since the transmitted wireless signal is fed back and travels back and forth in the wireless transmission path, a phase difference between the clock signal Stx and the clock signal Sf is $2\Delta\theta$. Further, there is a phase difference $\Delta\theta1$ between the reference clock signal Sr and the clock signal Stx, and there is a phase difference $\Delta\theta2$ between the clock signal Sf and the reference clock signal Sr. The phase adjustment unit 201 detects the phase difference $\Delta\theta1$ by the phase comparator 401, detects the phase difference $\Delta\theta2$ by the phase comparator 402, and adjusts the phase of the clock signal Stx so that the phase differences $\Delta\theta1$ and $\Delta\theta2$ are equal ($\Delta\theta1=\Delta\theta2$). In a case where the phase differences are $\Delta\theta1=\Delta\theta2(=\Delta\theta)$, the phase of the reference clock signal Sr is equal to the phase of the clock signal Srx, and the clock signals can be synchronized between the apparatuses.

In short, the phase adjustment unit 201 detects the phase change amount due to the fluctuation in the wireless transmission path characteristic from the fed-back wireless signal and generates the clock signal Stx obtained by adding an opposite phase change to the phase change to the clock signal Sr. Accordingly, the clock signal Srx, obtained by addition of the phase change due to the fluctuation in the wireless transmission path characteristic to the transmitted wireless signal, is synchronized with the reference clock signal Sr.

Figure 6:
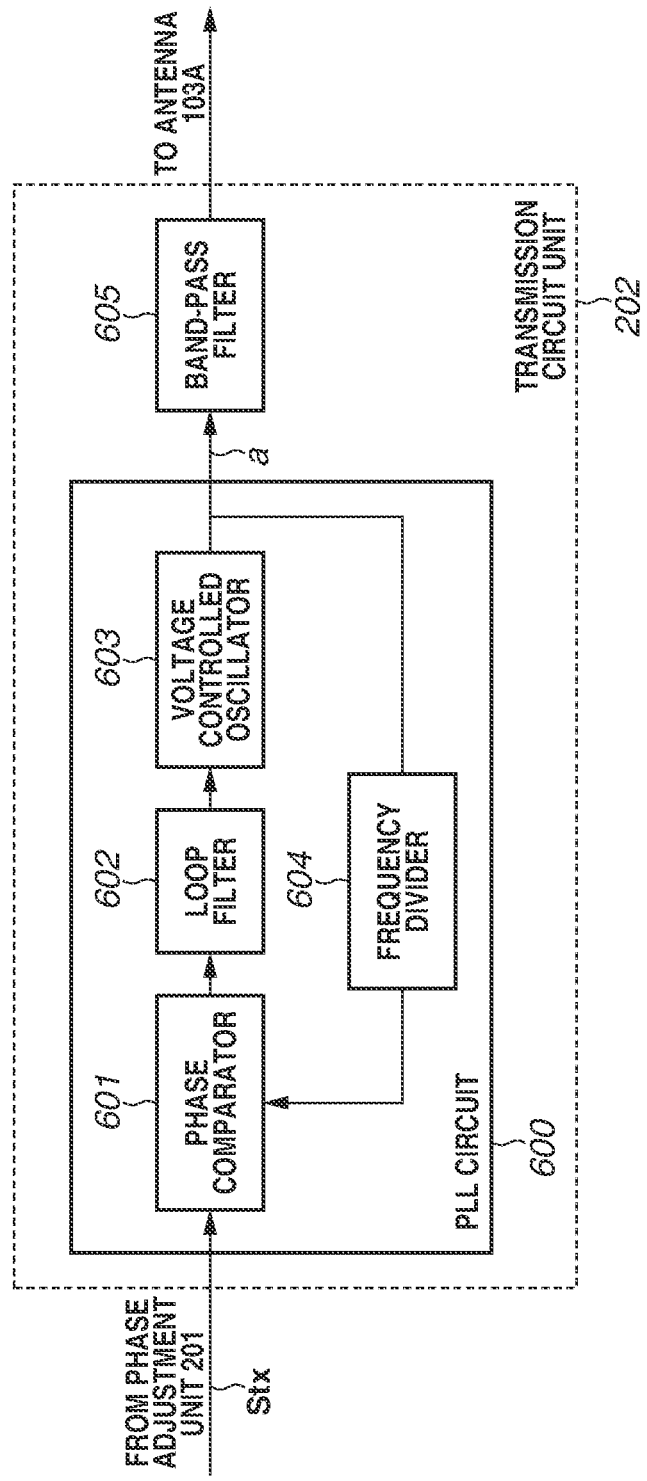
FIG. 6 illustrates a configuration of a transmission circuit unit according to the first example embodiment.

FIG. 6 illustrates a configuration of the transmission circuit unit 202 illustrated in FIG. 2. While FIG. 6 illustrates only the transmission circuit unit 202, the transmission circuit unit 302 illustrated in FIG. 3 has the same configuration.

In FIG. 6, a phase locked loop (PLL) circuit 600 includes a phase comparator 601, a loop filter 602, a voltage controlled oscillator 603, and a frequency divider 604. The PLL circuit 600 up-converts an input signal by changing a frequency division number of the frequency divider 604. A band-pass filter 605 is an ideal band-pass filter that attenuates an unnecessary signal and passes only a frequency of an output signal a of the PLL circuit 600, and transmits a signal a having a desired frequency to the antenna 103A.

Figure 7:
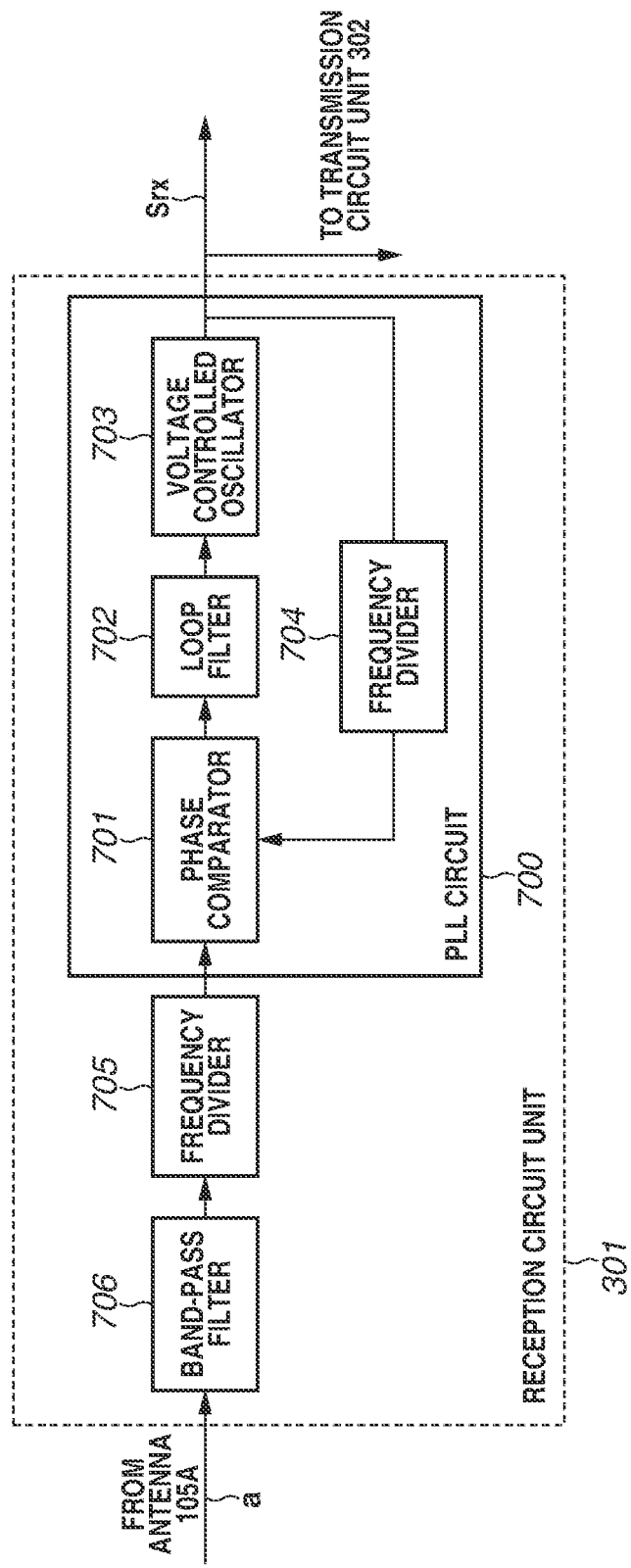
FIG. 7 illustrates a configuration of a reception circuit unit according to the first example embodiment.

FIG. 7 illustrates a configuration of the reception circuit unit 301 illustrated in FIG. 3. While FIG. 7 illustrates only the reception circuit unit 301, the reception circuit unit 203 illustrated in FIG. 2 has the same configuration. The reception circuit unit 301 includes a PLL circuit 700, a frequency divider 705, and a band-pass filter 706. The PLL circuit 700 that includes a phase comparator 701, a loop filter 702, a voltage controlled oscillator 703, and a frequency divider 704 has a function of reducing a phase noise of an input signal. The band-pass filter 706 has the same function as that of the band-pass filter 605 and passes only the signal a having the desired frequency. The reception circuit unit 301 down-converts the signal a that has passed through the band-pass filter 706 by the frequency divider 705, outputs the clock signal Srx via the PLL circuit 700, and transmits the clock signal Srx to the transmission circuit unit 302.

It is necessary to use different frequencies for communication between the antennas 103A and 105A and for communication between the antennas 103B and 105B in order to prevent interference. A signal of a frequency $f_1$ is used for the communication between the antennas 103A and 105A, and a signal of a frequency $f_2$ is used for the communication between the antennas 103B and 105B. In the communication between the antennas 103A and 105A, the transmission circuit unit 202 uses the frequency divider 604 having the frequency division number with which the output signal a of the PLL circuit 600 becomes the frequency $f_1$, and the band-pass filter 605 that allows only a signal of the frequency $f_1$ to pass. The reception circuit unit 301 also uses the band-pass filter 706 that allows only the signal a of the frequency $f_1$ to pass. Similarly, the frequency divider 604 and the band-pass filters 605 and 706 that can communicate at the frequency $f_2$ are used in the communication between the antennas 103B and 105B, and thus two wireless transmission paths between the antennas 103A and 105A and the antennas 103B and 105B are separated.

In the present example embodiment, non-modulated communication is performed, but the present invention is not limited thereto, and a modulation method such as amplitude modulation (AM) may be used.

With the above-described configuration, the present example embodiment can provide a system that can wirelessly synchronize clock signals of two apparatuses even in an environment in which a phase change occurs due to a fluctuation in a wireless transmission path characteristic.

A configuration of an entire wireless communication system according to a second example embodiment is described below. The configuration of the wireless communication system according to the present example embodiment is identical to that according to the first example embodiment except that a changeover switch (SW) for switching input of a reference clock signal is added to the processing unit 102 according to the first example embodiment. Thus, the configuration different from the first example embodiment is mainly described.

The PLL circuits 600 and 700 provided respectively in the transmission circuit units 202 and 302 and the reception circuit units 203 and 301 used in the first example embodiment require a certain time length after startup to output a signal with a stable phase. The required time length is referred to as a pull-in time. Similarly, in the phase adjustment unit 201, there is also generated a pull-in time until a clock signal becomes the phase relationship illustrated in FIG. 5 and a signal with a stable phase is output. In the pull-in time, the fed-back clock signal Sf includes the phase change of the output of the PLL circuit in addition to the phase change due to the fluctuation in the wireless transmission path characteristic. Thus, in the present example embodiment, a configuration is described in which the phase adjustment unit 201 detects only the phase change due to the fluctuation in the wireless transmission path characteristic, so that the pull-in time until the clock signal having the phase relationship illustrated in FIG. 5 is output can be shortened.

Figure 8:
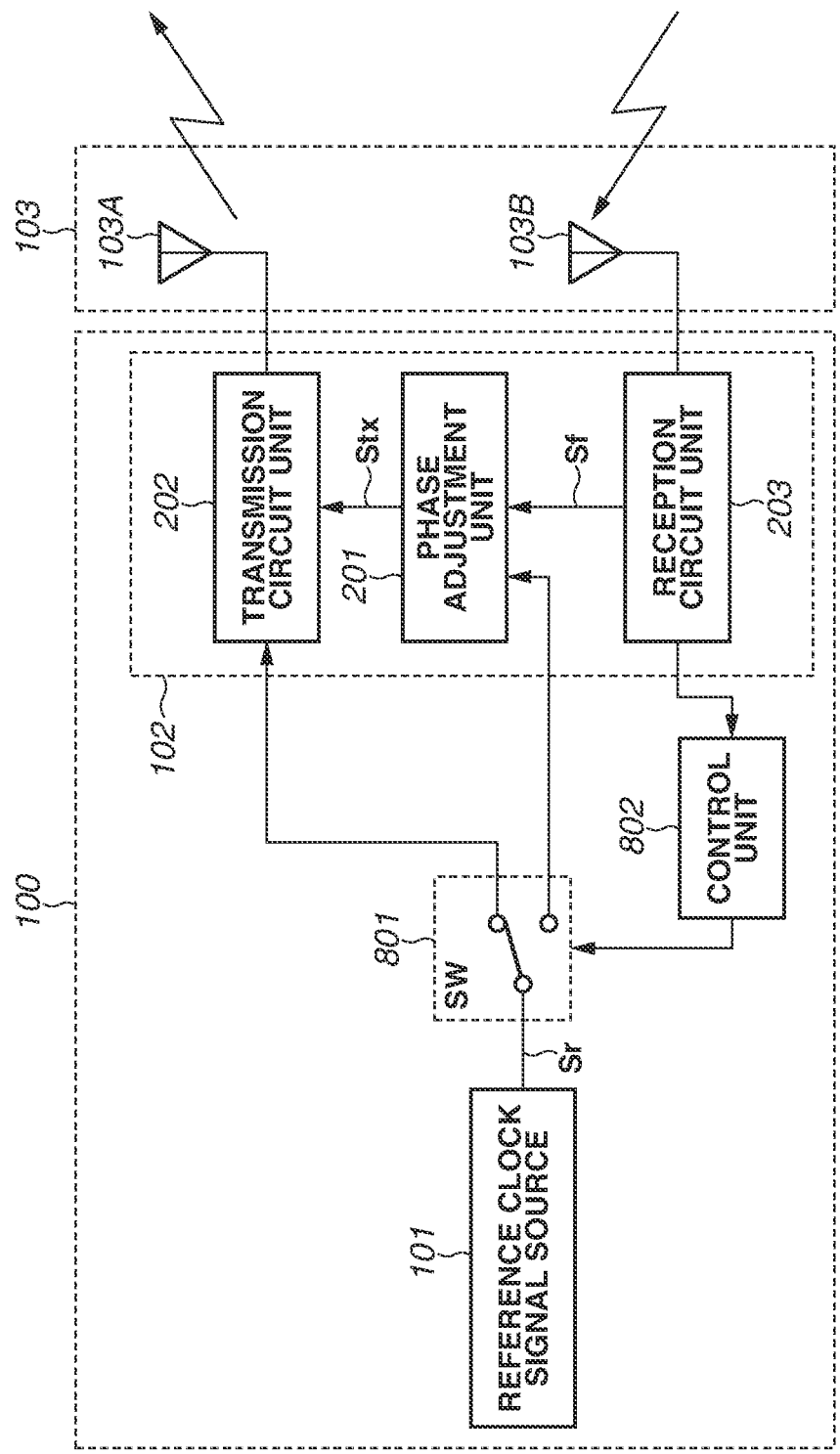
FIG. 8 illustrates a configuration of a clock source apparatus according to a second example embodiment.

FIG. 8 illustrates a configuration in which a SW 801 and a control unit 802 are added to the clock source apparatus 100. The SW 801 is a switch for switching input of the reference clock signal Sr between the transmission circuit unit 202 side and the phase adjustment unit 201 side. The control unit 802 controls a timing of switching the SW 801.

Next, a flow of operations from startup of the system to startup of the phase adjustment unit 201 according to the present example embodiment is described with reference to FIG. 9. First, in step S901, immediately after the startup of the system, the control unit 802 controls the SW 801 so that the reference clock signal Sr is input to the transmission circuit unit 202 side. In other words, the phase adjustment unit 201 does not operate, and a wireless signal with a phase equal to that of the reference clock signal Sr is transmitted at this time. In step S902, the control unit 802 waits for a certain period of time in this state until the phases of outputs of the PLL circuits 600 and 700, which are respectively used in the transmission circuit units 202 and 302 and the reception circuit units 203 and 301, are stabilized. In step S903, the control unit 802 determines whether the phases are stabilized, and the control unit 802 waits until the fluctuation of the phase of the clock signal Sf obtained from the fed-back wireless signal is stabilized, i.e., until output voltages of the loop filters 602 and 702 in the PLL circuits 600 and 700 each converge within a set value. At this time, the clock signal Sf includes only the phase change due to the fluctuation in the wireless transmission path characteristic.

If the control unit 802 determines that the phases of the signals are stabilized (YES in step S903), in step S904, the SW 801 is turned to the phase adjustment unit 201 side, and the phase adjustment unit 201 operates and starts an operation as a wireless clock synchronization system described in the first example embodiment.

FIG. 10 illustrates a time chart of each component block according to the present example embodiment. A horizontal axis in FIG. 10 represents a time and represents the pull-in time until the phase of the output of each of the circuit units is stabilized.

In FIG. 10, a time t0 represents a start-up time, times t1, t2, t3, and t4 each represent a pull-in time from the start-up of each of the transmission and reception circuit units, and a time t5 represents a pull-in end time of the phase adjustment unit 201 according to the present example embodiment. In a case where all of the circuit units including the phase adjustment unit 201 are started at the same time without the SW 801 being provided, the pull-in time of each of the circuit units increases, and as a result, the pull-in time of the entire system increases.

Figure 9:
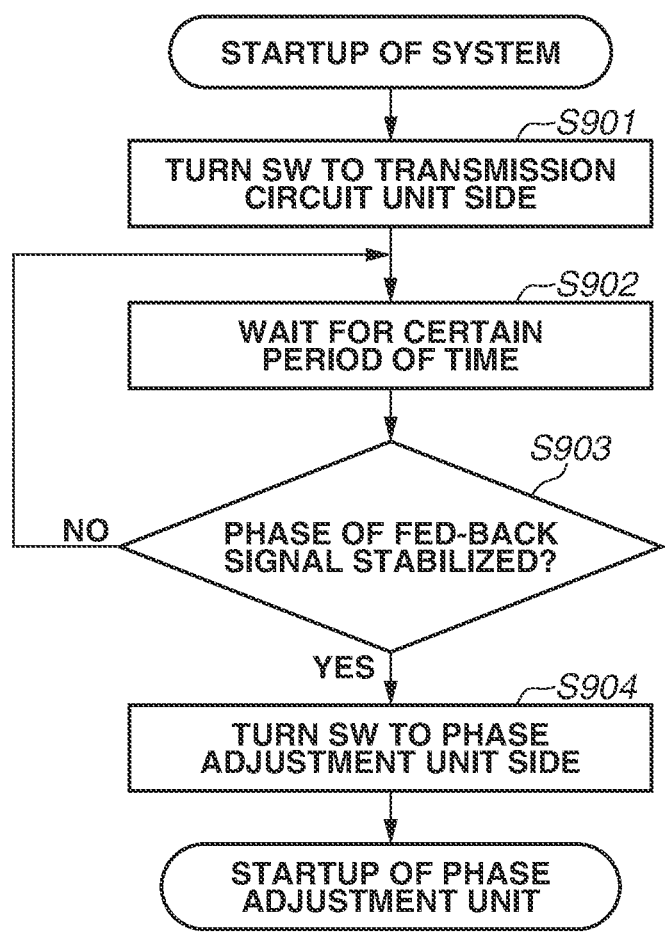
FIG. 9 is a flowchart illustrating a flow of operations according to the second example embodiment.

According to the flow illustrated in FIG. 9, in a case where the SW 801 is turned to the transmission circuit unit 202 side of the clock source apparatus 100, the output phases are stabilized in the order of the transmission circuit unit 202, the reception circuit unit 301, the transmission circuit unit 302, and the reception circuit unit 203. Subsequently, the SW 801 is turned to the phase adjustment unit 201 side, and the operation of the phase adjustment unit 201 is started form the time t4, so that the operation of the entire system is stabilized, and the total pull-in time from the time t0 to the time t5 can be shortened compared with the first example embodiment.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2022-003904, filed Jan. 13, 2022, which is hereby incorporated by reference herein in its entirety.

What is claimed is:

1. A wireless communication system comprising:
a first wireless communication apparatus; and
a second wireless communication apparatus,
wherein the first wireless communication apparatus includes a first transmission circuit unit, a first reception circuit unit, a phase adjustment unit, a first antenna unit, and a second antenna unit,
wherein the second wireless communication apparatus includes a second reception circuit unit, a second transmission circuit unit, a third antenna unit, and a fourth antenna unit,
wherein the first transmission circuit unit and the second reception circuit unit each include a first band-pass filter configured to allow a first frequency to pass and not allow a second frequency to pass,
wherein the second transmission circuit unit and the first reception circuit unit each include a second band-pass filter configured to allow the second frequency to pass and not allow the first frequency to pass,
wherein the first transmission circuit unit wirelessly transmits, from the first antenna unit at the first frequency, a first signal generated based on a first clock signal,
wherein the second reception circuit unit generates a second clock signal based on the first signal received at the first frequency by the third antenna unit,
wherein the second transmission circuit unit wirelessly transmits, from the fourth antenna unit to the first wireless communication apparatus at the second frequency, a second signal generated based on the second clock signal,
wherein the first reception circuit unit generates a third clock signal based on the second signal received at the second frequency by the second antenna unit, and
wherein the phase adjustment unit detects a change in a phase due to a fluctuation in a transmission path characteristic, based on the third clock signal, and controls a phase of the first clock signal based on the detected change in the phase.

2. The wireless communication system according to claim 1,
wherein the first wireless communication apparatus further includes a reference clock signal source configured to output a reference clock signal, and
wherein the phase adjustment unit includes:
a voltage controlled oscillator configured to operate at a frequency based on a voltage;
a first phase comparator configured to output a first phase difference signal based on a phase difference between the reference clock signal and an output signal of the voltage controlled oscillator;
a second phase comparator configured to output a second phase difference signal based on a phase difference between the reference clock signal and the third clock signal; and
a loop filter configured to generate a voltage of the voltage controlled oscillator based on the first phase difference signal and the second phase difference signal.

3. The wireless communication system according to claim 2, wherein the loop filter includes a differential integration circuit to which the first phase difference signal and the second phase difference signal are input.

4. The wireless communication system according to claim 2, wherein the first wireless communication apparatus further includes a switch configured to switch the reference clock signal to be output to one of the first transmission circuit unit and the phase adjustment unit.

5. The wireless communication system according to claim 4, wherein the first wireless communication apparatus further includes a control unit configured to determine a state in which an output voltage of the loop filter converges within a set value as a stable state and to control the switch based on a determination result.

6. The wireless communication system according to claim 1, wherein the wireless communication system delays startup of the phase adjustment unit until after startup of the first transmission circuit unit, the first reception circuit unit, the second transmission circuit unit, and the second reception circuit unit.

7. A wireless communication apparatus comprising:
a transmission circuit unit configured to wirelessly transmit, from a first antenna unit at a first frequency, a first signal generated based on a first clock signal to another wireless communication apparatus;
a reception circuit unit configured to generate a second clock signal based on a second signal received at a second frequency by a second antenna unit from the another wireless communication apparatus; and
a phase adjustment unit configured to detect a change in a phase due to a fluctuation in a transmission path characteristic, based on the second clock signal, and to control a phase of the first clock signal based on the detected change in the phase,
wherein the transmission circuit unit includes a first band-pass filter configured to allow the first frequency to pass and not allow the second frequency to pass, and
wherein the reception circuit unit includes a second band-pass filter configured to allow the second frequency to pass and not allow the first frequency to pass.

8. The wireless communication apparatus according to claim 7, wherein the second signal is generated based on a third clock signal generated by the other wireless communication apparatus.

9. The wireless communication apparatus according to claim 8, wherein the third clock signal is generated based on the first signal.

10. The wireless communication apparatus according to claim 7, wherein the wireless communication apparatus delays startup of the phase adjustment unit until after startup of the transmission circuit unit and the reception circuit unit.

11. The wireless communication apparatus according to claim 1, wherein the first transmission circuit unit further includes a first frequency divider configured to generate the first frequency,
wherein the second transmission circuit unit further includes a second frequency divider configured to generate the second frequency, and
wherein non-modulated communication is performed.

* * * * *